INVENTOR.
ROLAND FIESS,
BY
McMorrow, Berman + Davidson
ATTORNEYS.

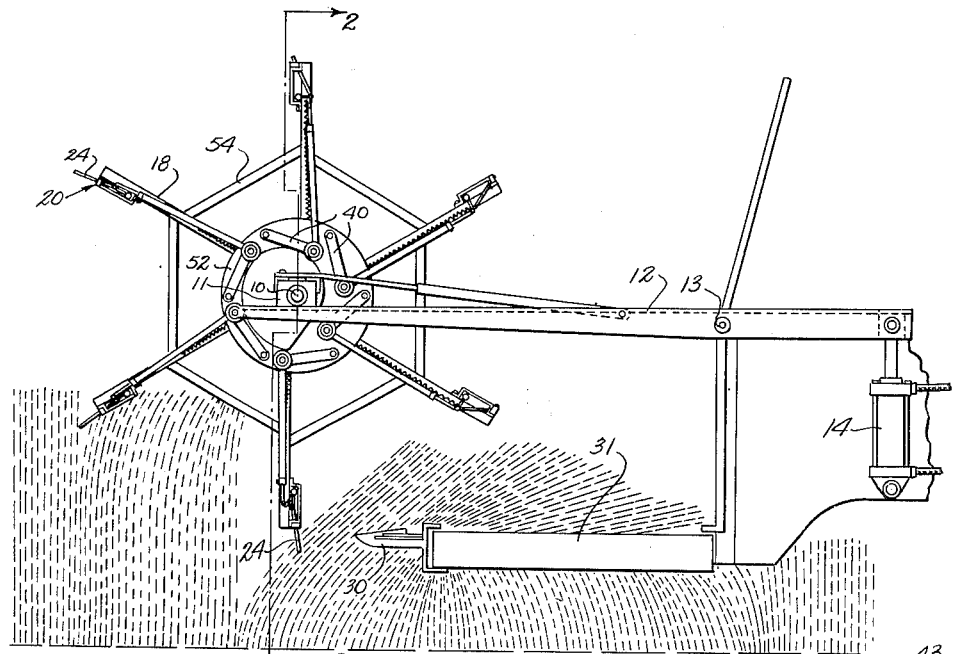
FIG. 1.
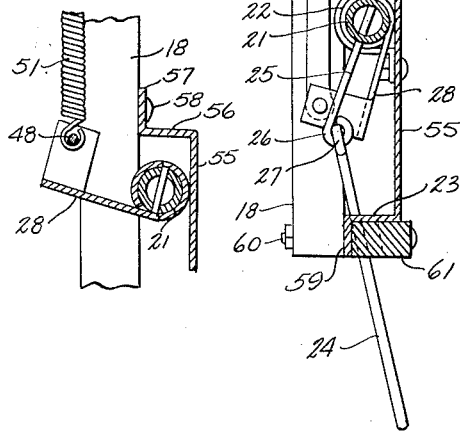
FIG. 3.  FIG. 4.
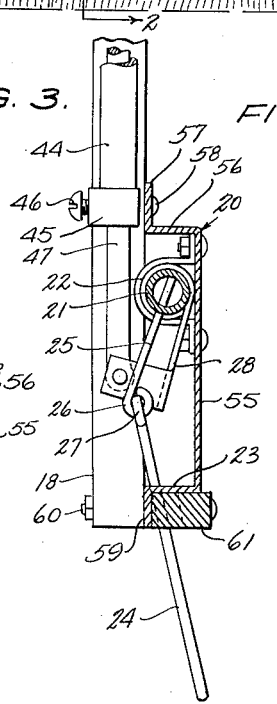
FIG. 6.
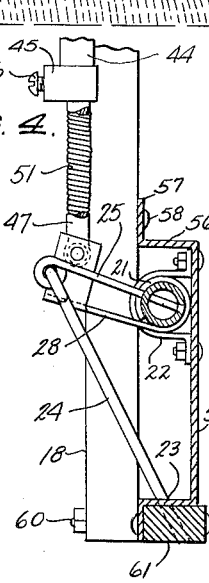
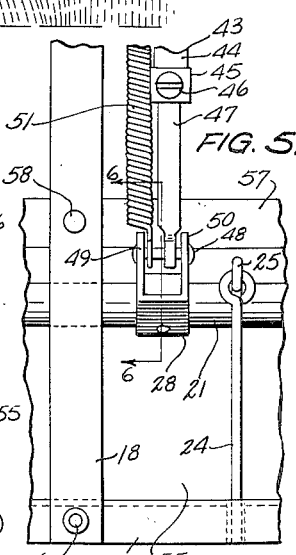
FIG. 5.
INVENTOR.
ROLAND FIESS,
BY
McMorrow, Berman & Davidson
ATTORNEYS.

Oct. 13, 1953          R. FIESS          2,654,984
HARVESTING REEL
Filed Nov. 17, 1950                3 Sheets-Sheet 3

INVENTOR.
ROLAND FIESS,
BY
McMorrow, Berman + Davidson
ATTORNEYS.

Patented Oct. 13, 1953

2,654,984

UNITED STATES PATENT OFFICE 2,654,984

HARVESTING REEL

Roland Fiess, Ephrata, Wash.

Application November 17, 1950, Serial No. 196,259

2 Claims. (Cl. 56—226)

This invention relates to gathering reels for harvesting machines and more particularly to a reel for a harvester-thresher combine for harvesting grain.

In harvesting grain, such as wheat and oats, it frequently happens that at the time of harvest a portion of the standing grain will have been blown or beaten down by storms or in other ways, so that a considerable portion of it lies below the level of the sickle bar of the harvesting machine. Under such conditions the harvesting machine will pass over this down or fallen grain leaving it on the ground to waste. In attempting to salvage such grain the operators have applied rows of fixed teeth to the slate or battens of the reels of the harvesting machines to pick up the down or fallen grain and raise it above the sickle bar and onto the grain table of the combine. This practice has proved unsatisfactory for various reasons among which is the inability of such fixed teeth or spikes to release the material after it has been carried past the sickle bar and cut off so that the grain and straw is carried around by the reel, and the inability of such a tooth-equipped reel to gather in short grain while maintaining the teeth clear of the sickle bar of the machine.

It is, therefore, among the objects of the present invention to provide an improved harvester reel having rows of teeth or spikes disposed one row along each slat or batten of the reel to pick up fallen grain and raise such grain above the sickle bar of the harvester and onto the grain table of the latter and having means for cyclically or periodically retracting the teeth as they pass the sickle bar to release the grain and for projecting the teeth as they reach the grain ahead of the sickle bar, and adjustment means for maintaining the teeth retracted when their operation is not necessary or for only partially projecting the teeth; which provides reel slats or battens of improved construction in combination with the extensile and retractile spikes, which can be installed on an existing combine and operated thereby with no material modification of the combine construction; which will maintain the teeth or spikes clear of the sickle bar at all times to avoid damage to the cutter blade; which is fully adjustable for different operating conditions; and which is simple and durable in construction, economical to manufacture, and positive and effective in operation.

Other objects and advantages will become apparent from a consideration of the following description and the appended claims in conjunction with the accompanying drawings wherein:

Figure 1 is a somewhat diagrammatic end elevational view of a combine reel illustrative of the invention and of the associated portion of the reel carrying combine;

Figure 3 is a fragmentary cross sectional view on an enlarged scale on the line 3—3 of Figure 2;

Figure 4 is a cross sectional view with parts broken away similar to Figure 3, but showing the parts in a different operative position from that illustrated in Figure 3;

Figure 5 is a front elevational view of the fragmentary portion of the reel illustrated in Figures 3 and 4;

Figure 6 is a fragmentary cross sectional view on the line 6—6 of Figure 5;

With continued reference to the drawings, the numeral 10 designates the reel shaft which extends coaxially through the reel and is journaled at its respectively opposite ends in bearing blocks, as indicated at 11, slidably mounted on the upper edges of reel supporting arms, one of which is illustrated and designated at 12, near the outer ends of such arms. The arms 12 are disposed one at each end of the reel and are pivotally mounted intermediate their length on the combine by suitable pivotal mountings, as indicated at 13, and suitable manually or power operated means, such as the hydraulic cylinder and piston device 14, are connected to the rearward ends of the arms to raise and lower the forward ends of the arms and adjustably move the reel up and down. Means are provided for sliding the bearing blocks 11 outwardly and inwardly on the corresponding reel supporting arms to adjustably move the reel forwardly and rearwardly to compensate for different operating conditions.

Suitable means, not illustrated, are also provided for continuously rotating the reel shaft while the harvesting machine is in operation.

As the means for raising and lowering the reel, the means for moving the reel forwardly and rearwardly and the means for driving the reel shaft are all well known to the art, an illustration and description of these mechanisms have not been considered necessary for the purposes of the present disclosure.

Figure 2:
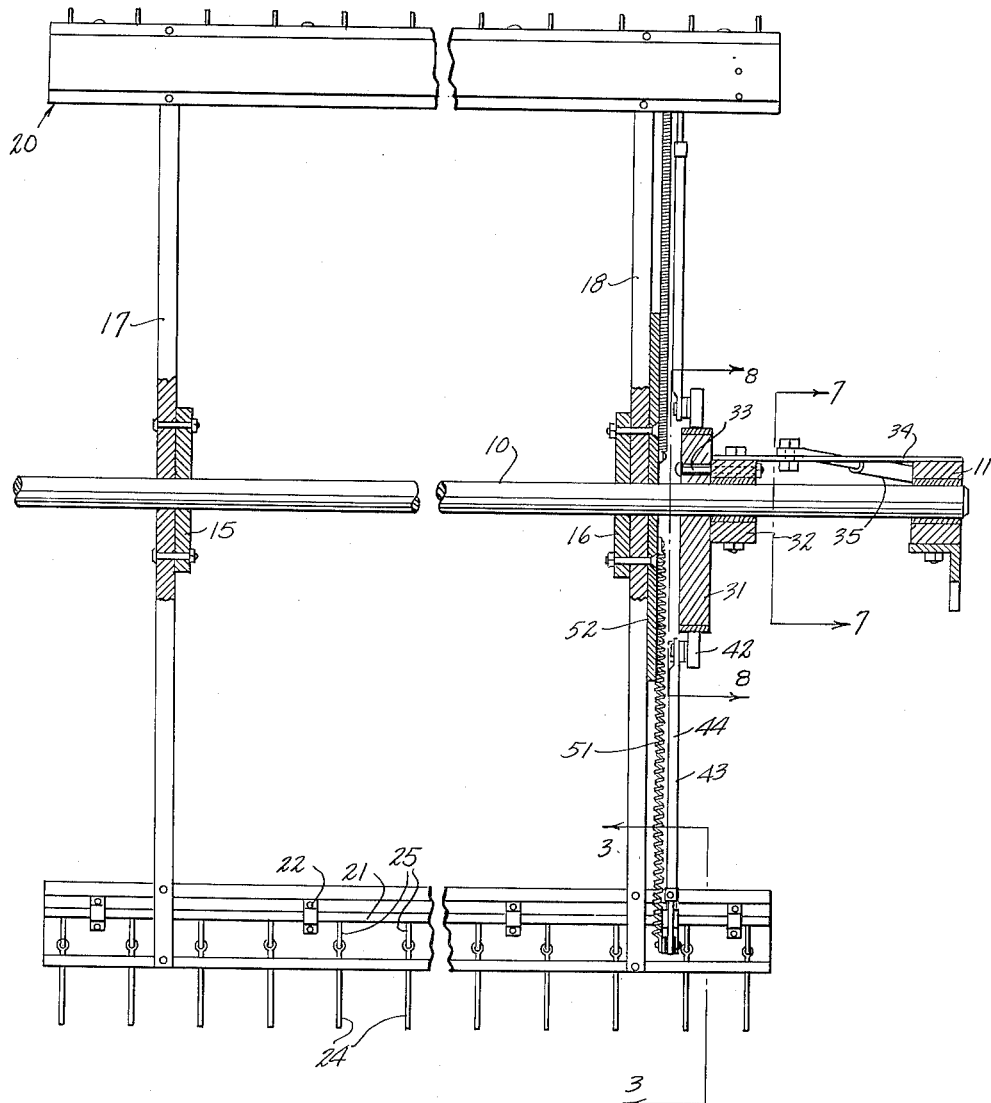
Figure 2 is a fragmentary longitudinal cross sectional view on an enlarged scale on the line 2—2 of Figure 1.
Figure 7:
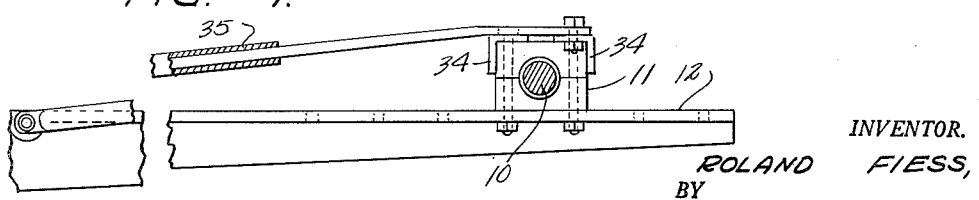
Figure 7 is a cross sectional view on the line 7—7 of Figure 2.
Figure 8:
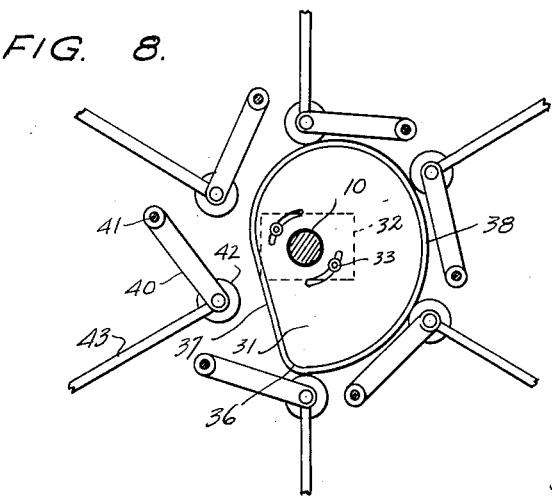
Figure 8 is a fragmentary cross sectional view on the line 8—8 of Figure 2.
Figure 9:
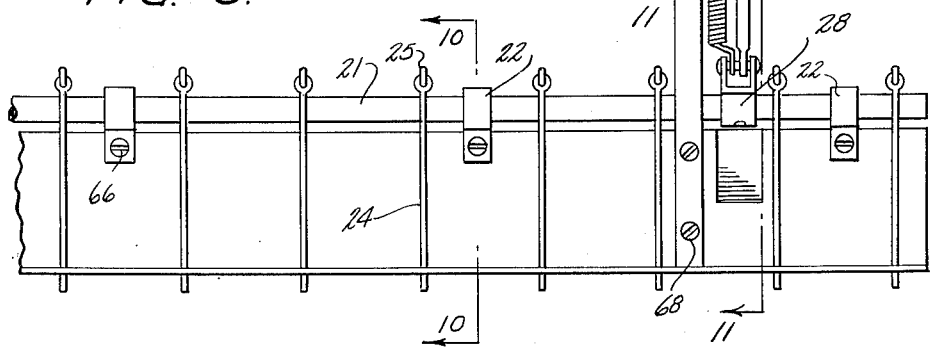
Figure 9 is an elevational view of a somewhat modified form of reel slat assembly.
Figure 10:
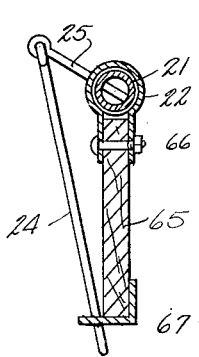
Figure 10 is a transverse cross sectional view on the line 10—10 of Figure 9.
Figure 11:
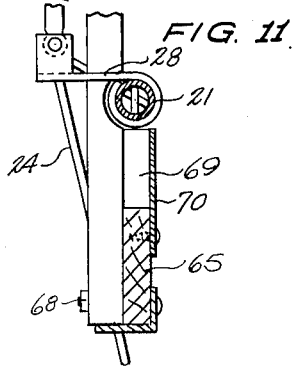
Figure 11 is a transverse cross sectional view on the line 11—11 of Figure 9.
Figure 12:
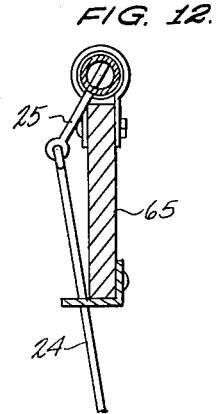
Figure 12 is a transverse cross sectional view similar to Figure 10 but showing the parts in a different operative position from that illustrated in Figure 10.

Hubs, as indicated at 15 and 16 in Figure 2, are secured on the shaft 10 at spaced apart locations along the latter. While only two hubs are shown in the accompanying illustration, it is to be understood that three or more such hubs may be used, if desired, depending upon the length of the reel and that one hub will be located near each end of the reel. A group of spokes 17 are secured at their inner ends to the hub 15 and a similar group of spokes 18 are secured at their inner ends to the hub 16. In both cases the spokes project radially from the shaft 10 and are spaced apart at substantially equal angular intervals around the shaft. The number of spokes carried by such hub is equal to the number of reel slats or battens to be provided, the accompanying drawings illustrating six such slats, and the hubs are rotationally positioned relative to each other so that the spokes are arranged in groups extending longitudinally of the shaft with the center lines of all of the spokes in each group substantially in a common plane passing through the axis of the shaft 10. The spokes are supported in angular position by the tangentially arranged braces 54.

The reel slats, generally indicated at 20, are carried by the spokes, one slat being disposed at the outer ends of each group of spokes as described above. The spokes are of substantially the same length so that the slats are spaced from and substantially parallel to the shaft 10 and are spaced apart at substantially equal angular intervals around the shaft.

A tubular shaft 21 extends longitudinally of each slat or batten 20 near the inner edge of the corresponding slat and is rotatably mounted on the slat by suitable means, such as the spaced apart bearing clips 22 secured to the slat and surrounding the tubular shaft.

At its outer edge the slat is provided with a flange 23 having a row of spaced apart apertures therein and elongated spikes or teeth 24 are slidably mounted one in each aperture in the flange 23 of each of the slats 20. This provides a row or series of spaced apart spikes extending longitudinally of each slat of the reel and projectible from the outer edge of the slat, that is, the edge of the slat remote from the reel shaft 10. A plurality of arms 25 are secured each at one end to the tubular shaft 21, at spaced apart locations along this tubular shaft, and project radially from the tubular shaft with their center lines substantially in a common plane which also includes the axis of the tubular shaft. Each arm is provided at its distal end with an eye formation 26 and each spike 24 is provided at its inner end with an eye formation 27 engaged in an eye formation of a corresponding arm 25 so that each arm is pivotally connected at its distal end to the inner end of a corresponding spike.

With this arrangement, a partial rotation of the tubular shaft 21 in one direction will project the spikes 24 outwardly of the outer edge of the corresponding slat through the associated flange 23 and partial rotation of the tubular shaft in the opposite direction will retract the spikes through the flange 23 until the outer ends of the spikes are substantially flush with the outer edge of the corresponding reel slats.

An actuating arm 28 is secured to each tubular shaft 21 near one end of the corresponding tubular shaft and projects radially from the tubular shaft for connection to mechanism, presently to be described, for periodically imparting partial rotational movements in alternatively opposite directions to the tubular shaft.

As is particularly illustrated in Figure 1, the sickle bar 30 of the machine is mounted at the forward edge of the grain table 31 and the reel is carried above and somewhat forwardly of the sickle bar. When the grain is down, it is necessary to operate the reel at its lowest position and ahead of the sickle bar so that the outer edges of the reel slats will reach the grain disposed below the level of the sickle bar. In order for the reel to pick up this grain and raise it above the sickle bar and onto the table 31, it is necessary that the spikes 24 be fully extended during the time that they are in engagement with the grain before they reach the location of the sickle bar. Under these operating conditions, the outer edges of the reel slats are operated so close to the sickle bar that, if the spikes were extended as they reach the sickle bar, there would be danger of the spikes going into the sickle bar and damaging or destroying the cutting blade of the machine. The spikes are, therefore, retracted as the corresponding reel slats reach the location of the sickle bar, this retraction of the spikes freeing the spikes from the grain and dropping the grain onto the grain table 31 of the machine so that the grain will not be carried over by the spikes.

A cam disc 31 is journaled on the shaft 10 between the hub 16 and the bearing block 11, as illustrated in Figure 2, and adjacent the hub. A bearing block 32 is journaled on the shaft 10 at the side of the cam adjacent the bearing block 11 and is adjustably secured to the cam by suitable means, such as the bolts 33 extending through arcuate slots in the cam and through corresponding apertures in the bearing block 32, so that the cam can be rotationally adjusted relative to this bearing block to a limited extent. Bars 34, preferably formed of suitable angle iron, connect the bearing blocks 11 and 32, so that the bearing blocks 32 and the cam 31 are held in position spaced a predetermined distance from the block 11 and against rotation.

An adjustable length strut 35 comprising two telescopically associated members is connected at one end to one of the bars 34 and at its other end to a fixed portion of the machine to reinforce the bars 34 and rigidly hold the cam against rotational movement. The adjustable length feature of this strut 35 permits the reel to be moved forwardly and rearwardly for different operating conditions, as described above.

The cam has a downwardly extending lobe 36 and a flat dwell 37 at the rearward side of the reel and preferably has a binding 38 of wear resisting material extending therearound.

Arms 40 are carried by a disc 52 which surrounds the shaft 10 and is connected to the hub 16, each of these arms being pivotally connected at one end to the disc by means including a pivot pin or bolt 41.

Cam following rollers 42 are carried one by each of the arms 40, each roller being journaled on a suitable axle pin carried by the corresponding arm 40 at the end of the arm remote from the associated pin 41.

These cam followers 42 ride on the peripheral surface of the cam 31 and are moved inwardly and outwardly relative to the shaft 10 as they are revolved around the fixed cam.

Adjustable length links 43 are connected one to each arm 40 at the roller carrying end of the latter and to an actuating arm 28 carried by the corresponding tubular shaft 21.

Each of the links 43 comprises a tubular member 44 having at one end an eye formation receiving the axle pin of the associated cam follower 42, and having at its other end a collar 45 provided with a tapped hole receiving a set screw 46, and a rod member 47 slidably received in the collar carrying end of the tubular member and provided at its outer end with an eye formation receiving a pin 48 extending through the spaced apart legs 49 and 50 of the bifurcated outer end portion of the corresponding arm 28.

The cam 31 is so designed that the spikes 24 will be fully retracted when the corresponding cam followers are on the dwell 37 of the cam. The amount that the spikes are projected outwardly of the corresponding slats when the associated cam followers are on the lobe 36 of the cam can be regulated by adjusting the length of the corresponding adjustable length links 43. This is done by loosening the set screw 46, moving the member 47 relative to the member 43 until the desired length is obtained and then tightening the set screw to hold the members 44 and 47 in adjusted position relative to each other.

The cam followers 42 and links 43 are effective to move the spikes 24 from their retracted to their projected positions. The spikes are moved from their projected to their retracted positions by retracting springs 51. Each of these springs is an elongated, coiled tension spring connected at one end to the corresponding pin 48 and connected at its other end to the disc 52 on which the arms 40 are pivotally mounted.

The spikes are thus always resiliently urged to their retracted position and are forced outwardly to their projected position only when the corresponding cam followers ride over the lobe of the cam 31.

When the grain is badly down, the reel is adjusted to its lowest position and the links 43 are adjusted to provide the maximum projection of the spikes 24. Under these conditions the cam will be carefully set so that the spikes will be retracted before they reach the sickle bar of the machine. When the combine is being used to cut very short grain the reel will be adjusted so that the outer edges of the slats pass very close to the sickle bar. Under these conditions, it is better not to use the spikes since they only comb through the short grain and do not move it against the sickle bar and onto the table. Under these conditions, the adjustable length links 43 will be set so that the cam followers are substantially free of the cam 31, the spikes remain retracted by the retracting springs 51 and no projecting movement is imparted to them by the cam followers and the links. For other conditions, the links may be adjusted to project the spikes the optimum amount corresponding to the height of the grain and the down or tangled condition which may exist. It will be noted that the shape of the cam is such that after a slat leaves the sickle bar in the direction of rotation of the reel the spikes will remain retracted until the corresponding slat has reached a position near the top of the reel. The cam will then start to project the spikes and by the time the slat has reached a position between the top of the reel and a position in front of the reel at the level of the reel shaft, the spikes will have been fully projected to engage the grain as the reel slat is brought downwardly and rearwardly into contact with the grain.

The reel slat illustrated in Figures 3 to 6 inclusive comprises an elongated sheet metal body including a flat intermediate portion 55 having substantially parallel longitudinal edges and having a perpendicularly extending flange 56 along one edge and the corresponding flange 23 along its other edge extending perpendicularly from the intermediate portion in the same direction as the flange 56. At its edge remote from the intermediate portion 55 the flange 56 carries an outwardly extending ledge or flange 57 disposed perpendicular to the flange 56 and secured to the corresponding spokes by suitable means, such as the screws or brads 58. A ledge or flange 59 extends outwardly perpendicularly from the edge of the flange 23 remote from the intermediate portion 55 and is secured to the corresponding spokes by suitable means, such as the bolts or screws 60. A wear strip 61 of wood or other suitable material is disposed in the space between the outer side of the flange 23 and the side of the ledge 59 remote from the spokes and this wear strip is provided with apertures receiving the spikes 24. The wear strip is also secured to the spokes by the screws 60 and is removable for replacement when subjected to excessive wear or breakage.

The modified form of reel slate illustrated in Figures 9, 10, 11 and 12 comprises an elongated slat 65 formed of wood or similar material, and having an elongated rectangular cross sectional shape and substantially parallel longitudinal edges. The reel spokes extend along one side of the body 65 and are secured thereto and the tubular shaft 21 extends along the inner edge of the slat body 65 and is rotatably secured to the slat body by the bearing clips 22 having spaced apart legs straddling the body 65 at the inner edge of the latter and secured to this body by screws 66, there being one screw for each bearing clip.

An angle member 67, conveniently formed of sheet metal, extends along the outer edge of the slat body 65 with one leg bearing against the face of the slat body remote from the spokes and the other leg extending across the outer edge of the slat body and projecting therebeyond. The angle member is secured to the slat body by the screws 68 extending one through each spoke and through the slat body and the angle member and the leg of the angle member projecting beyond the outer edge of the slat body is provided adjacent the slat body with apertures slidably receiving the spikes 24.

At the location of the arm 28 on the tubular shaft 21 the slat body 65 is provided with a rectangular notch or recess 69 to receive the arm 28 when this arm is moved to its position corresponding to maximum projection of the spikes 24 beyond the outer edge of the reel slat. A flat plate 70 is disposed at the side of the slat body 65 remote from the spokes and covering the recess 69 so that material will not be caught in the recess during rotation of the reel to interfere with the operation of the arm 28.

The operation of the spikes or teeth 24 is the same with both forms of reel slats, as illustrated and described above, and the remaining mechanism may be the same for either form of reel slat.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a harvester reel including a rotatable reel shaft, reel slats spaced from and substantially parallel to said shaft and disposed at substantially equal angular intervals therearound, and spokes supporting said slats on said shaft, a row of spaced apart spikes slidably carried by each slat for projection beyond the outer edge of the latter, shafts rotatably carried one by each slat and connected to said spikes for moving the latter inwardly and outwardly relative to the corresponding slats, spring means connected to the slat carried shafts resiliently urging said spikes inwardly of the corresponding slats, a cam journaled on said reel shaft and having an acute lobe and a flat dwell, means adjustably connected to said cam for holding the latter against rotation with said lobe directed downwardly, cam followers carried by said reel and engaging said cam, and means including adjustable length links connecting each of said cam followers to a corresponding slat carried shaft to impart rotational movements to said slat carried shafts as the cam followers pass over the lobe of said cam, each of said adjustable length links comprising a tubular member pivotally connected at one end to the corresponding cam follower, a collar on the other end of said tubular member and having a tapped hole therein, a rod slidably received in said tubular member and projecting at one end from said one end of the latter with said one end of the rod connected to the corresponding slat carried shaft, and a set screw threaded into the tapped hole in said collar and engaging said rod to hold the latter in selected positions of longitudinal adjustment relative to said tubular member.

2. In a harvester reel including a rotatable reel shaft, reel slats spaced from and substantially parallel to said shaft and disposed at substantially equal angular intervals therearound, and spokes supporting said slats on said shaft, a row of spaced apart spikes carried by each slat for projection beyond the outer edge of the latter, shafts rotatably carried one by each slat and connected to said spikes for moving the latter inwardly and outwardly relative to the corresponding slats, spring means connected to the slat carried shafts resiliently urging said spikes inwardly of the corresponding slats, a cam journaled on said reel shaft and having a lobe and a dwell, means connected to said cam for holding the latter against rotation with said lobe directed downwardly, cam followers carried by said reel and engaging said cam, and means including adjustable length links connecting each of said cam followers to a corresponding slat carried shaft to impart rotational movements to said slat carried shafts as the cam followers pass over the lobe of said cam, each of said reel slats comprising an elongated sheet metal body having a flat intermediate portion and flanges disposed one along each longitudinal edge of said intermediate portion and projecting perpendicularly in the same direction from the latter, and a wear strip extending along the other side of one of said flanges, said one flange and said wear strip having spaced apart apertures therein slidably receiving the corresponding spikes.

ROLAND FIESS.

References Cited in the file of this patent

UNITED STATES PATENTS

| Number | Name | Date |
|---|---|---|
| 507,255 | Benroth | Oct. 24, 1893 |
| 895,147 | Beal | Aug. 4, 1908 |
| 2,144,905 | Wallace | Jan. 24, 1939 |
| 2,489,516 | Booth | Nov. 29, 1949 |
| 2,497,729 | Heth et al. | Feb. 14, 1950 |

FOREIGN PATENTS

| Number | Country | Date |
|---|---|---|
| 99,283 | Sweden | July 2, 1940 |